(12) United States Patent
Dyck et al.

(10) Patent No.: US 7,377,090 B2
(45) Date of Patent: May 27, 2008

(54) APPARATUS AND METHOD FOR EQUINE FACIAL PROTECTION

(76) Inventors: Robyn A. Dyck, Box 3593, Steinbach, MB (CA) R5G 1P7; Paul Dyck, Box 3593, Steinbach, MB (CA) R5G 1P7

( * ) Notice: Subject to any disclaimer, the term of this patent is extended or adjusted under 35 U.S.C. 154(b) by 0 days.

(21) Appl. No.: 11/535,294

(22) Filed: Sep. 26, 2006

(65) Prior Publication Data

US 2007/0068124 A1  Mar. 29, 2007

Related U.S. Application Data

(60) Provisional application No. 60/719,987, filed on Sep. 26, 2005.

(51) Int. Cl.
*B68C 5/00* (2006.01)
*A01K 13/00* (2006.01)

(52) U.S. Cl. ........................ 54/80.1; 119/850

(58) Field of Classification Search ........ 54/80.1–80.5, 54/24, 12–13; 119/850
See application file for complete search history.

(56) References Cited

U.S. PATENT DOCUMENTS

| | | | | | |
|---|---|---|---|---|---|
| 275,654 | A | * | 4/1883 | Hise | 54/80.1 |
| 342,186 | A | * | 5/1886 | Corley | 54/80.1 |
| 669,909 | A | * | 3/1901 | Young | 54/80.1 |
| 673,738 | A | * | 5/1901 | Spong | 54/80.1 |
| 4,581,877 | A | * | 4/1986 | Wilber | 54/80.2 |
| 5,321,937 | A | * | 6/1994 | Hamilton | 54/80.2 |
| 5,345,751 | A | * | 9/1994 | Edwards | 54/80.2 |

* cited by examiner

*Primary Examiner*—Son T. Nguyen
(74) *Attorney, Agent, or Firm*—Ryan W. Dupuis; Adrian D. Battison; Michael R. Williams (57) ABSTRACT

A full frontal facial safeguard or protective facial shield apparatus protects the facial area of a horse against unwanted and unnecessary injuries, wounds and scaring caused by facial cuts, scratches, scrapes, bumps, and bruises. The apparatus comprises of a protective, padded facial shield spanning from a bridge area to a poll area of a horse while cheeks and the eye area of the horse remain unobstructed. The full frontal facial safeguard can be produced in various sizes to fit most breeds and sizes of horses.

15 Claims, 9 Drawing Sheets

FIG. 11

APPARATUS AND METHOD FOR EQUINE FACIAL PROTECTION

This application claims the benefit under 35 U.S.C. 119(e) of U.S. provisional application Ser. No. 60/719,987, filed Sep. 26, 2005.

FIELD OF THE INVENTION

This invention relates to a protective facial shield apparatus for a horse and more particularly to an equine facial shield that protects between the bridge and poll of the face of a horse substantially without obstructing the horse's field of vision.

BACKGROUND OF THE INVENTION

During training, horses may not immediately comprehend what is being asked of them and therefore may become frustrated. As an example, when learning to be loaded in a trailer, or stand tied, horses will often react aggressively and in a self destructive manner without regard to their surroundings. This aggressive, self destructive behavior often results in various wounds to the face and poll area, which in severe cases can cause permanent damage and scaring.

U.S. Pat. No. 4,040,239 describes protective headgear for horses being trained for racing or halter use. The headgear features a mask that conforms generally to the shape of the horse's head between the poll and muzzle of the animal, completely covering the upper face and sides of the head. The two sides of the padded mask are attached beneath the horse's head by buckles to secure the headgear in place. The mask includes ear holes and eye holes equipped with blinkers. Enclosure of the entire face leads to discomfort by blocking airflow and preventing heat from escaping. In addition, covering the sides of the face and adding blinkers obstructs the field of vision of the animal, which may cause safety concerns Finally, the ears and immediate surrounding area of a horse are highly sensitive, and therefore successfully securing an enclosed mask of this type on such an animal may prove to be both difficult and dangerous.

As a result, there is a demand for a protective apparatus that can be secured to a horses face with minimal ear contact and will protect the most frequently damaged portions of the face while in no way restricting or otherwise interfering with the horse's breathing or field of vision

SUMMARY OF THE INVENTION

According to a first aspect of the invention there is provided a facial protection apparatus for a face of a horse comprising:
 a protective pad extending in a longitudinal direction between opposed first and second ends, the pad comprising:
  a bridge portion at the first end of the pad which is elongate in the longitudinal direction and which is arranged to span at least a portion of a bridge of the face of the horse;
  a brow portion extending in the longitudinal direction from the bridge portion towards the second end of the pad, the brow portion being arranged to span a portion of the face of the horse above eyes of the horse; and
  an ear portion extending in the longitudinal direction from the brow portion towards the second end of the pad, the ear portion being arranged to span between ears of the horse; and strapping arranged to secure the pad against the face of the horse such that facial cheeks and eyes of the horse remain uncovered and a view from each of the eyes of the horse remains substantially unobstructed.

According to a second aspect of the invention there is provided a method of protecting a face of a horse comprising the steps of:
 placing a protective pad on a front portion of the face of the horse such that facial cheeks of said horse remain exposed:
 positioning the protective pad such that eyes of the horse remain uncovered; and
 positioning the protective pad such that a view from each of the eyes of the horse remains unobstructed.

Protection is provided for the animal without sacrificing comfort by placing the protective pad on the horse's face so that it covers the frequently damaged front portion of the face while leaving the sides of the face open to the air. The horse's safety is maintained by ensuring that the horse's field of vision is in no way restricted by the pad.

The ease of mounting the protective pad on the horse is improved by avoiding contact with the sensitive ears of the animal. This reduces the likelihood of a violent reaction from the animal, thereby increasing the level of safety and ease of mounting involved in securing the invention to the horse and increasing the horse's level of comfort.

Preferably the method further comprises the steps of positioning the protective pad such that a muzzle of the horse remains uncovered and nostrils of the horse remain unobstructed.

Preferably the method further comprises the steps of positioning the protective pad such that said pad substantially covers a bridge of the face, a forehead, a forelock, eyebrows and a poll of the horse.

Preferably the method further comprises the steps of strapping the protective pad to the horse at the poll of said horse such that such that a strap extends across the poll behind the ears of said horse and strapping the protective pad to the horse at the bridge of the face of said horse.

The present invention is shaped to follow the contours of the horse's face. The bridge portion extends upward from the nose along the narrow bridge of the horse's face and is narrow enough to fit between the eyes without blocking their view. Above the eyes, the brow portion is wide enough to cover the eyebrows and forehead, again without blocking the eyes. The ear portion extends upward from here, fitting between the sensitive ears of the horse, and is attached to a final poll portion behind the ears of the horse.

Preferably there is provided strapping for securing the protective pad on the face of horse adjacent the second end of said pad. Preferably there is provided a poll portion at the second end of the protective pad, said poll portion being attached to the ear portion opposite the brow portion and being wider than said brow portion, the strapping passing through holes in said poll portion on opposite sides of the longitudinal axis. Engagement of the strap and the wide poll portion at its opposite sides ensures that the strap doesn't contact the sensitive ears of the horse.

Preferably there is provided strapping for securing the protective pad on the face of the horse at the bridge portion, the bridge portion and having holes therein on opposite sides of the longitudinal axis for the strapping to pass through.

Preferably the strapping at the poll portion and the bridge portion is integral and comprises a single strap wrapped about the face of the horse, crossing itself beneath the face of the horse between the poll portion and the bridge portion. Preferably the single strap crosses itself again above the face of the horse at the bridge portion and has opposite ends connected by a buckle. Having a single strap wrapped around the horse's head and crossing sides thereof secures the pad from each side without requiring multiple buckles.

The present invention does not interfere with the use of a typical halter used to tie or lead the horse.

BRIEF DESCRIPTION OF THE DRAWINGS

In the accompanying drawings, which illustrate exemplary embodiments of the present invention.

DETAILED DESCRIPTION

Referring to the accompanying figures there is illustrated an equine facial protection apparatus generally indicated by reference numeral 10. Though various embodiments are shown in the accompanying figures, in each instance the apparatus is particularly suited for covering a front portion of the face of a horse for protecting generally between the poll area and the bridge area of the horse. The common features of the various embodiments will first be described herein.

In each instance the apparatus comprises a pad 12 which is elongate in a longitudinal direction between a first end 11 for positioning just above the nose of the horse to a second end 13 adjacent the ears of the horse. Longitudinally extending edges 15 extend along opposing sides of the pad between the first and second ends to define a narrow dimension in a lateral direction generally perpendicular to the longitudinal direction of the pad. The pad 12 is generally shaped for covering the poll, the forelock, the forehead, the eyebrows and at least part of the bridge of the face of the horse The narrow spacing between the opposing edges 15 ensures that the cheeks of the horse along with the area below and surrounding the eyes, as well as immediately below and in front of the ears, remains substantially unobstructed and uncovered by the pad.

The pad 12 includes a bridge portion 14 which is elongate in the longitudinal direction to extend from the first end 11 of the pad partway to the second end 13. The bridge portion 14 is suitably arranged to span at least a portion of the bridge of the horse's face.

A brow portion 16 extends in the longitudinal direction from the bridge portion towards the second end of the pad so that the bridge portion is arranged to span a portion of the face of the horse between and above the eyes of the horse. The edges 15 of the pad are stepped to become substantially wider at the eyebrows just above the eyes of the horse. By arranging the brow portion to be wider in the lateral direction than the bridge portion, the bridge potion does not obstruct the view forwardly and downwardly from the eyes of the horse while the brow portion still protects an eyebrow area immediately above the eyes. The stepped lateral dimension of the brow portion forms lobes 18 projecting laterally outwardly in relation to the bridge portion 14.

The pad 12 further includes an ear portion 20 which extends in the longitudinal direction from the brow portion towards the second end of the pad. The ear portion is substantially narrower than the bridge and the brow portion so as to be suitably arranged to span between the ears of the horse towards the poll of the horse.

A poll portion 22 of the pad 12 extends from the ear portion to define the second end of the pad. The poll portion 22 spans laterally outwardly in opposing directions from the ear portion to define a pair of laterally opposed ends 24 which are considerably wider in the lateral direction than either of the ear portion, the bridge portion or the brow portion.

The reduced lateral dimension of the ear portion between the poll portion 22 and the brow portion 16 defines a pair of laterally opposed ear recesses 26 which are suitably sized for receiving the ears of the horse therethrough while also accommodating an open and unrestricted area immediately in front of and below each of the ears. The brow portion 16 tapers inwardly from the wider lobes 18 back to the narrower lateral dimension of the ear portion at a sharper taper than the taper between the brow portion and the bridge portion so that the lobes 18 defining the wider brow portion are spaced sufficiently ahead of the ears of the horse so as not to provide any discomfort to the horse.

Suitable strapping 60 is connected to the pad 12 for secured of the pad to span the front portion of the face of the horse. The strapping 60 is suitably arranged to secure the pad 12 to the face of the horse independently of a halter 62.

In each embodiment the pad 12 of the apparatus includes at least an outer protective layer 40 formed of a durable wear-resistant material which assists in resisting weather and abrasion, and an inner padding layer 38 which is much softer than the outer protective layer 40. The inner layer comprises any suitable soft lining material to provide comfort to the horse and to provide some impact absorption.

Turning now more particularly to the embodiment of FIGS. 1 through 6, the first embodiment will now be described in further detail. In this instance the bridge portion 14 is similar in length in the longitudinal direction to the brow portion so that the first end of the pad terminates only partway along the bridge of the horse between the eyes and the nostrils thereof in use.

The strapping 60 in this instance comprises a pair of independent straps having respective buckles that are located on the same side in relation to the pad 12 for convenience of attaching to horse. The straps of the strapping 60 include a throat strap 64 and a chin strap 66.

The throat strap 64 is formed as an extension of the laterally protruding ends 24 of the poll portion 22 so that the strap is arranged to extend from the poll at a location behind the ears of the horse around the throat of the horse. A suitable throat pad 68 is mounted on the throat strap 64 for engaging against the throat of the horse to provide comfort to the horse when the throat strap 64 is securing the second end of the pad in place.

The first end 11 of the pad is secured by the chin strap 66 which extends around the chin of the horse and is well secured to the bridge portion of the pad. A suitable pad 70 is provided on the chin strap 66 for engaging beneath the chin of the horse when the chin strap 66 is secured thereabout.

Two cheek straps 72 are provided to extend generally in the longitudinal direction between the throat strap 64 and the chin strap 66 at both sides of the face of the horse. The cheek straps 72 are spaced along the throat and chin straps respectively, laterally outwardly from respective sides 15 of the pad 12. Spacing between the cheek straps 72 and the respective edges 15 of the pad is suitably arranged to locate the eyes of the horse between the edges 15 and the cheek straps 72 without obstructing the view of the horse from the respective eyes.

Each ear recess 26 is provided with an ear strap 73 which is connected between a respective one of the laterally opposed ends 24 of the poll portion and the brow portion at a location just above a respective one of the lobes 18. The ear straps 73 have a suitable length to cause the ends 24 of the poll portion to curve inwardly and conform to the shape of the head of a horse. The ear straps 73 are positioned spaced outwardly from the respective edges 15 of the pad so that the ear recesses 26, which are bound by the straps respectively, are resultingly sufficiently large to accommodate the ears of the horse therethrough while providing an open space in front of each ear which remains uncovered by the apparatus 10.

In the first embodiment, the pad 12 is formed of a plurality of layers in addition to the inner padding layer 38 and the outer protective layer 40. Throughout the length of the pad 12 from the bridge portion to the poll portion, a stiffener layer 74 is provided in the form of a relatively rigid sheet of plastic material which assists the pad in holding the general shape which conforms about the face of the horse. The stiffener layer of plastic material is situated immediately against an inner side of the outer wear-resistant layer 40.

An additional forming layer 76 is provided in the form of a layer of suede between the inner padding layer 38 and the stiffener layer 74 of plastic material. The forming layer of suede material adds some additional stiffness while assisting in securing the plastic to the underside of the outer protective layer 40. All of the layers of plastic, leather and suede forming the protective outer layer 40, the stiffener layer 74 and the forming layer 76 are arranged to have sufficient flexibility to allow some conforming to the shape of the face of the horse.

Figure 1:
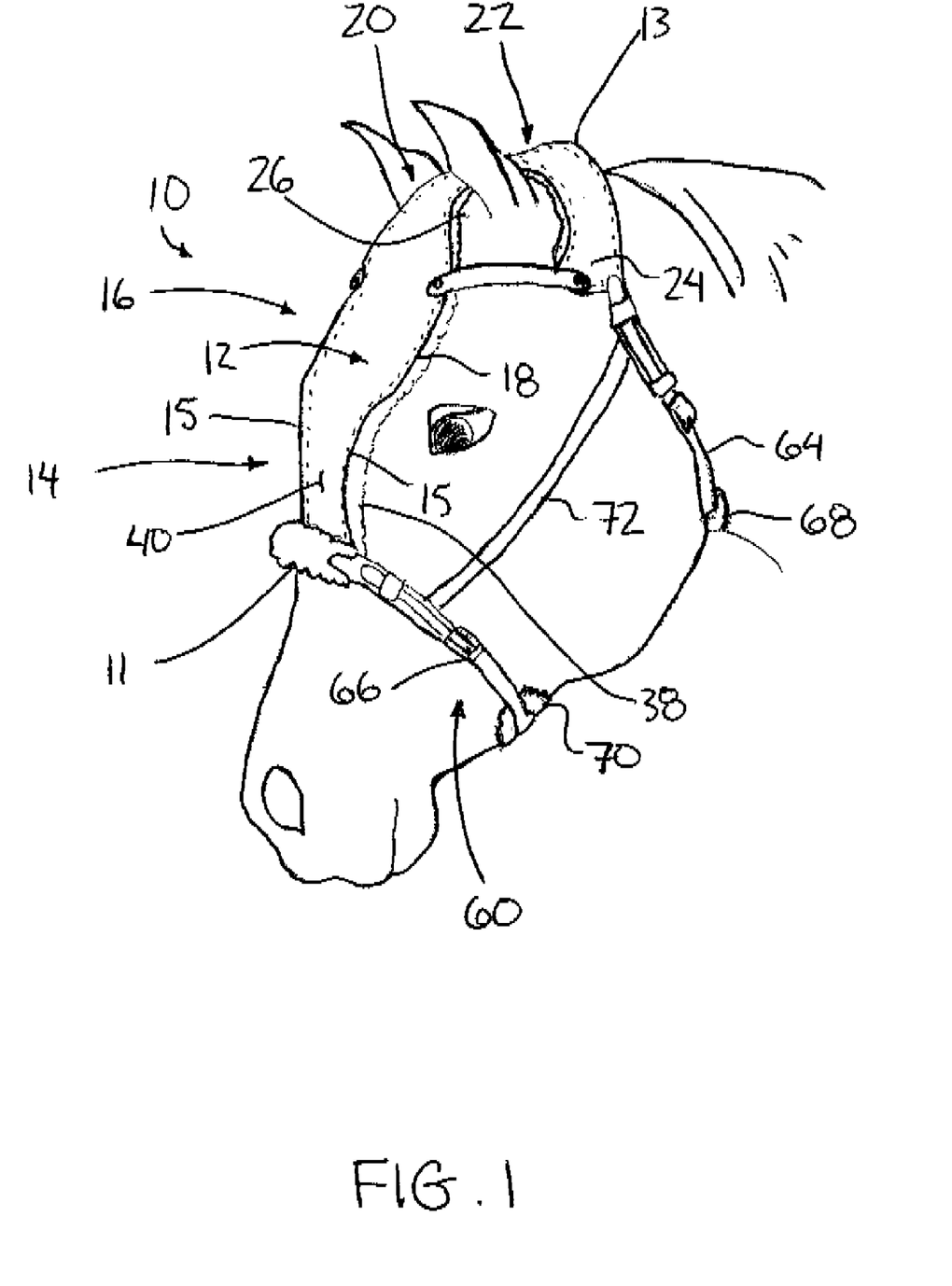
FIG. 1 is a side elevational view of a facial protection apparatus, according to a first embodiment, shown mounted on a horse.
Figure 2:
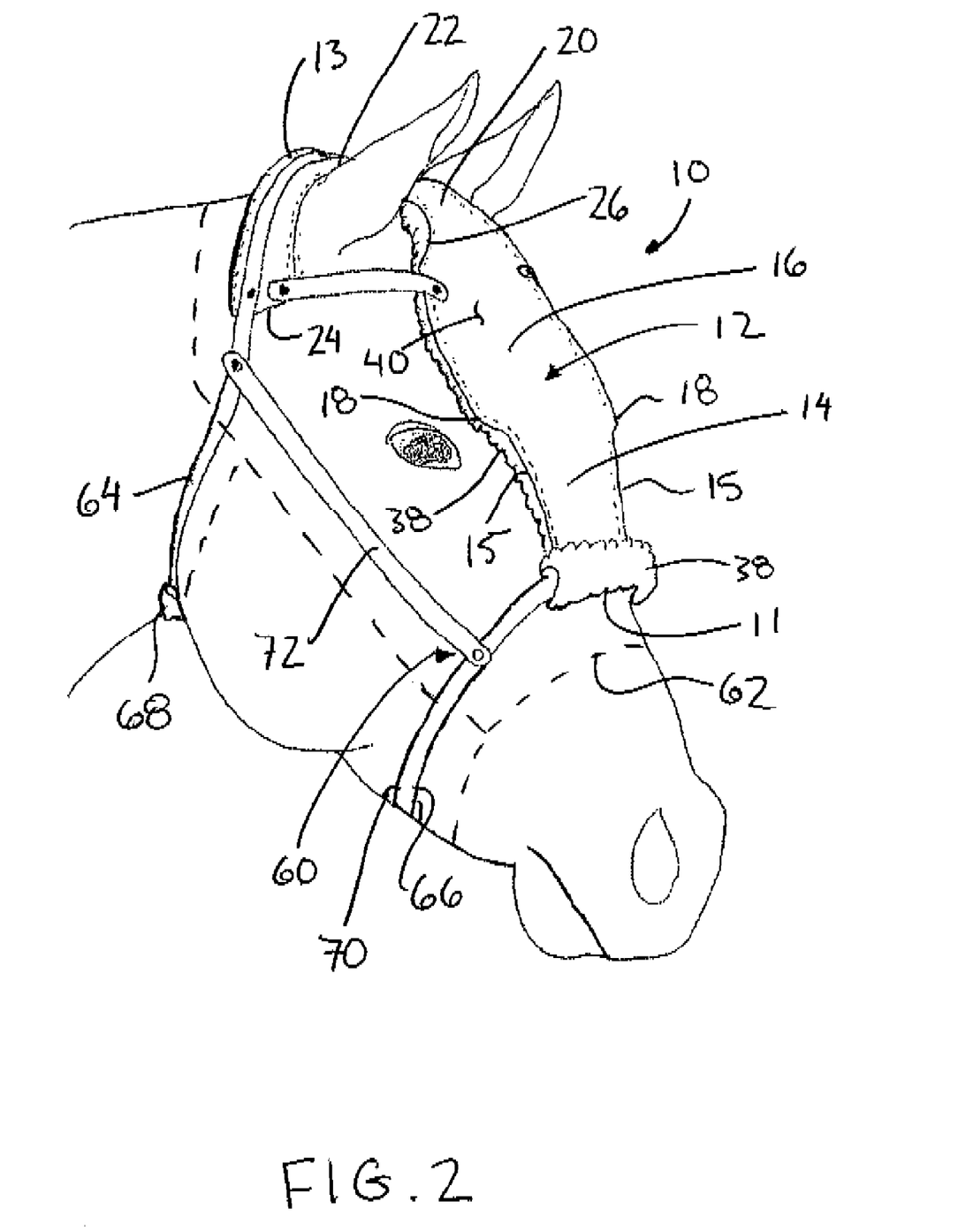
FIG. 2 is a side elevational view of the apparatus, according to FIG. 1, shown from an opposing side of the horse in relation to FIG. 1.
Figure 3:
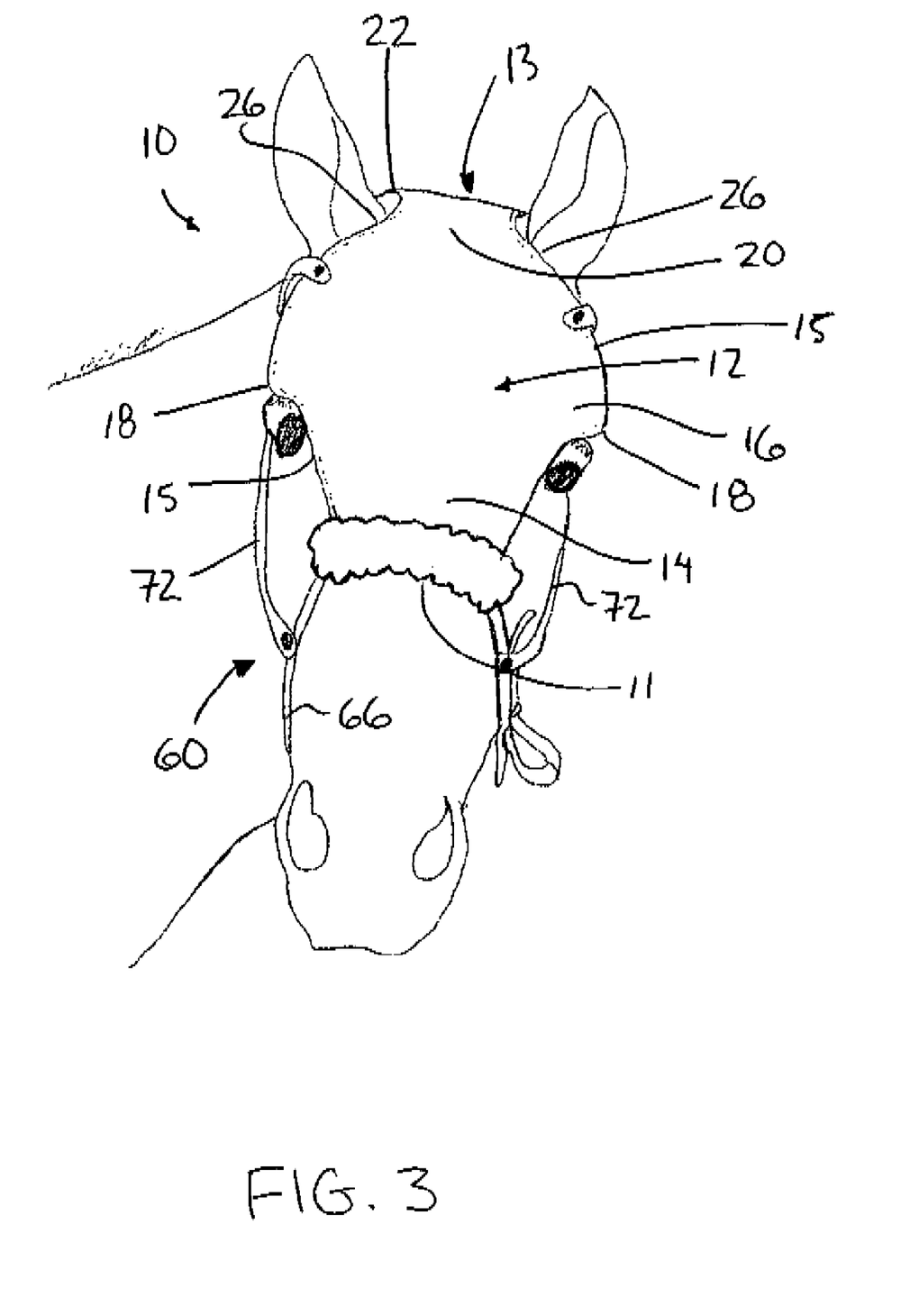
FIG. 3 is a front elevational view of the apparatus.
Figure 4:
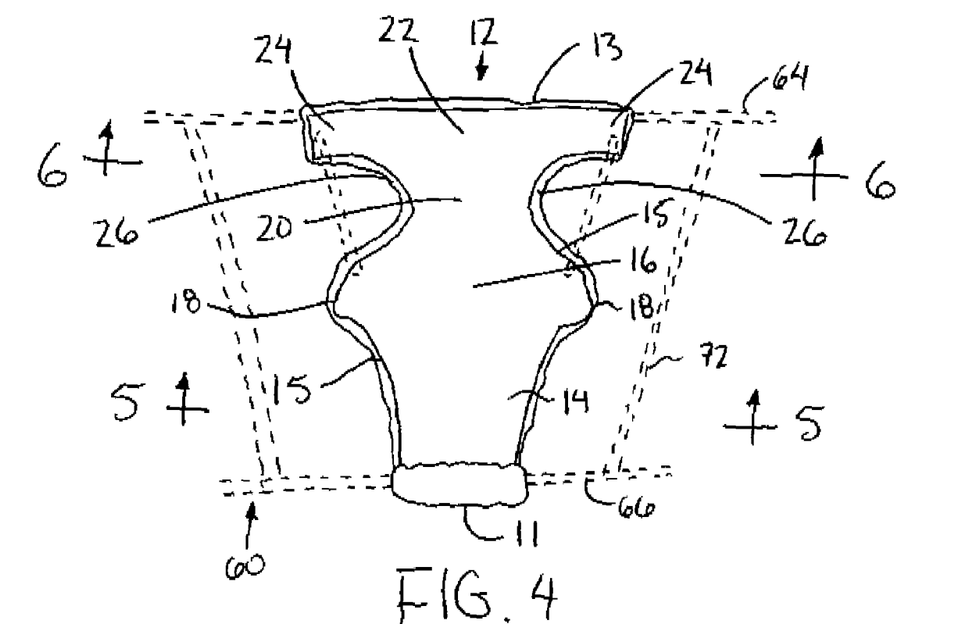
FIG. 4 is a plan view of the apparatus, according to the first embodiment, shown removed from the horse and with some of the strapping removed.
Figures 5, 6:
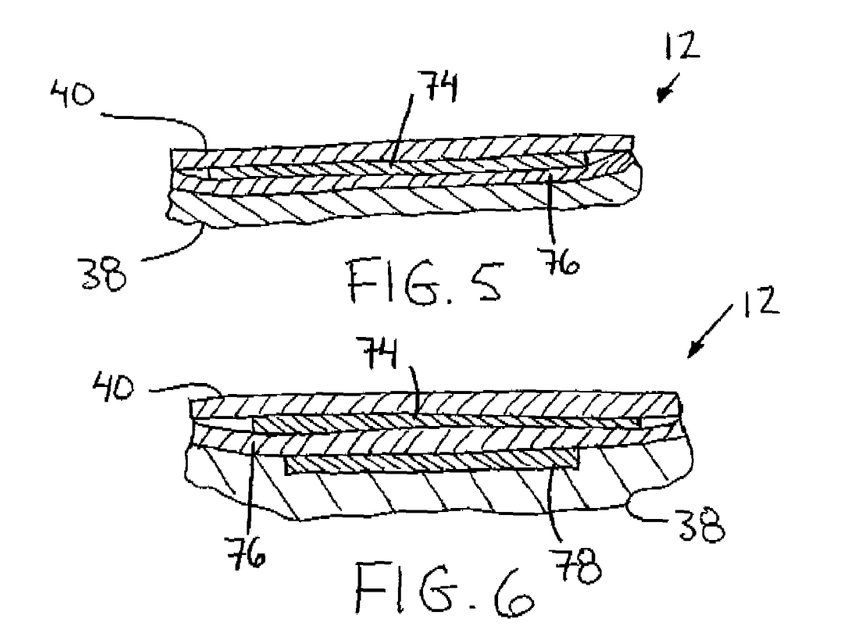
FIG. 5 is a sectional view along the line 5-5 of FIG. 4.
FIG. 6 is a sectional view along the line 6-6 of FIG. 4.
Figure 7:
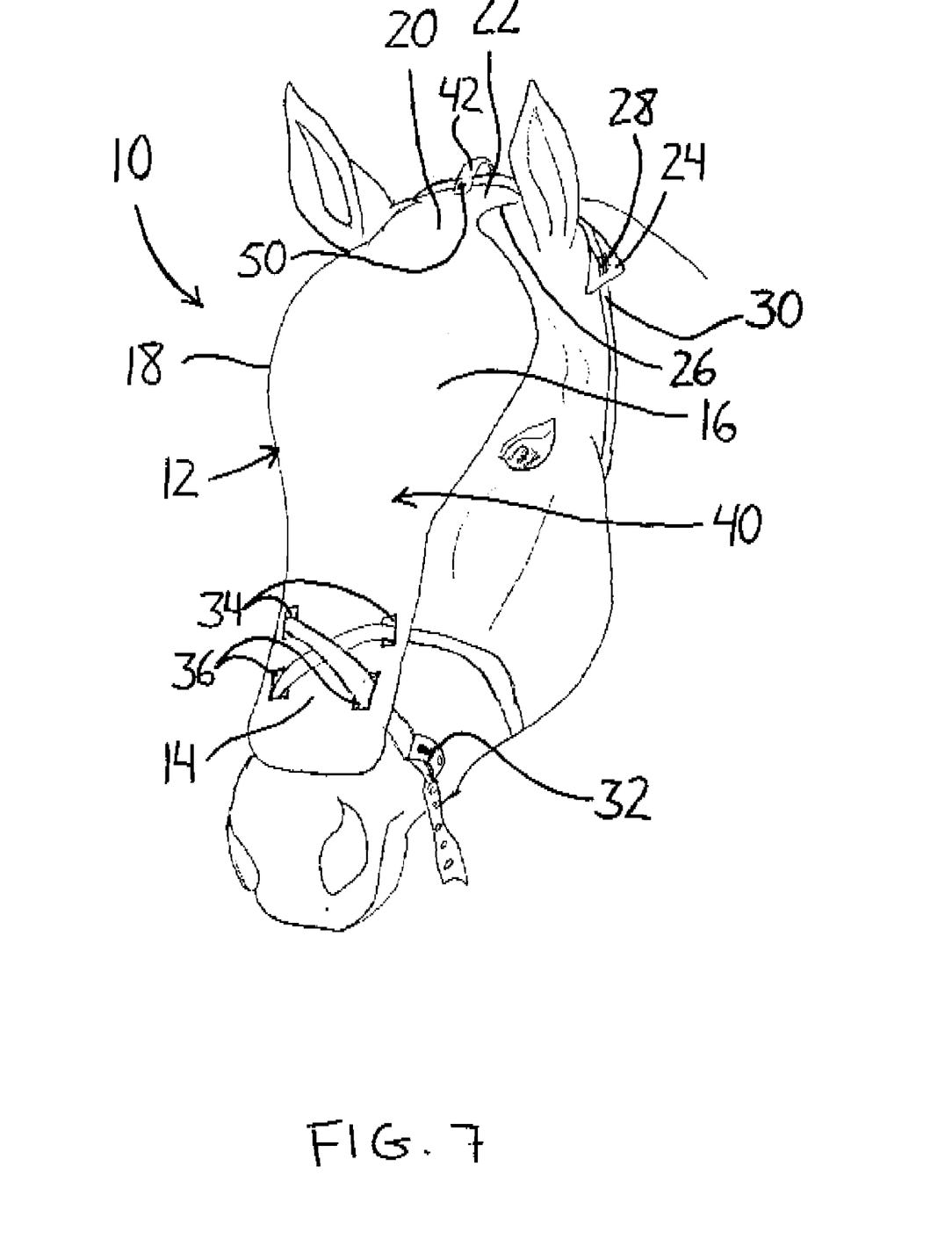
FIG. 7 is a front perspective view of a horse wearing a facial protection apparatus according to a second embodiment.
Figure 8:
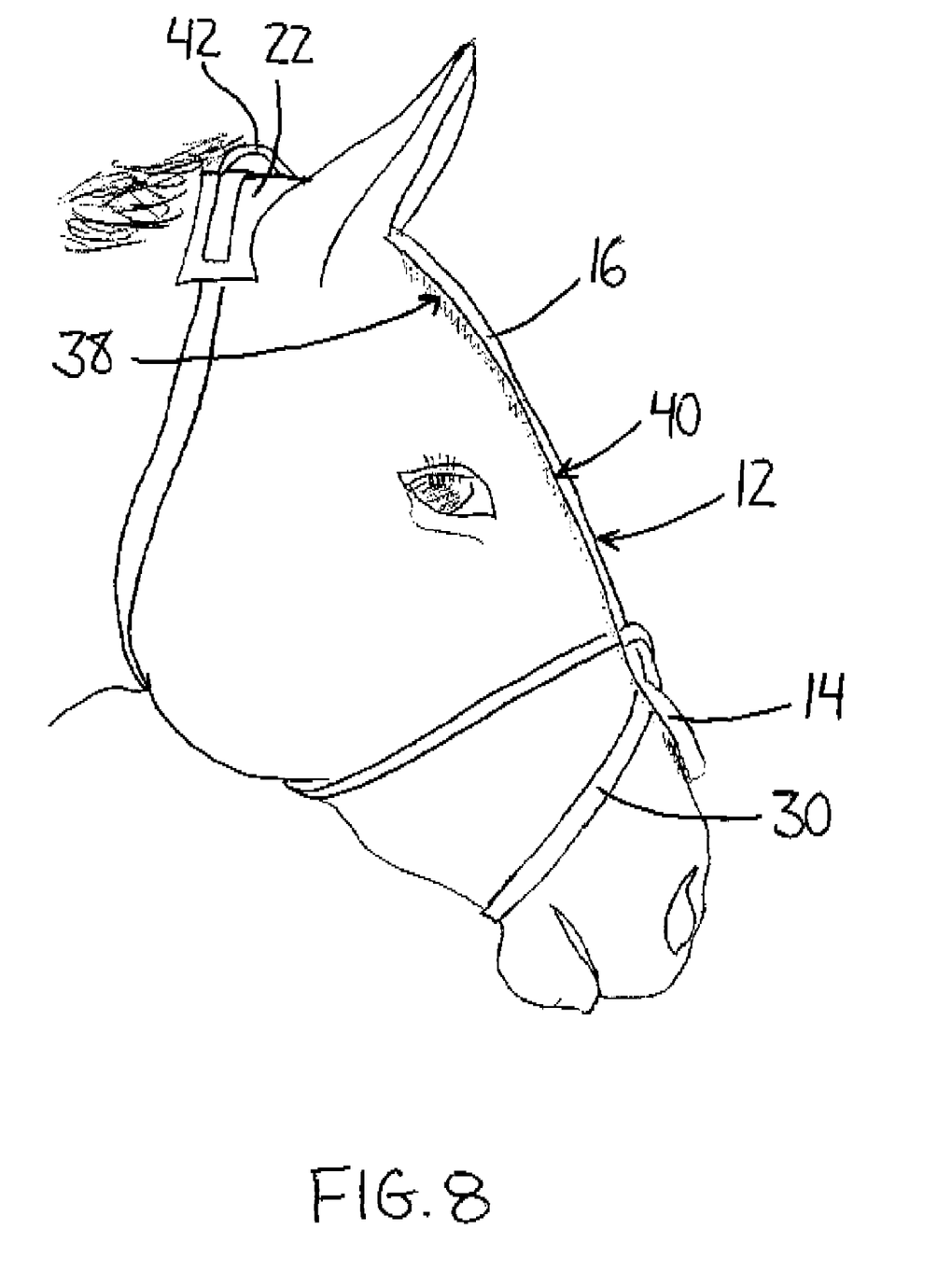
FIG. 8 is a side view of the horse wearing the facial protection apparatus according to FIG. 7.

As shown in FIG. 6, at the poll portion 22 and adjacent thereto, an additional padding layer 78 is provided comprising dense foam or other suitable impact absorbing material to provide extra protection to the horse at the poll area.

At the first end 11 of the pad 12 the outer side of the outer protective layer 40 forming the bridge portion 14 is overlapped by at least the inner padding layer 38 which wraps over the first end of the pad for additional comfort to the horse.

When the apparatus according to the first embodiment is supported in combination with a halter, the overall length of the pad 12 is arranged to be shorter than space between the bridge strap and poll strap of the halter so that the bridge portion of the pad is not overlapped by the hatter but rather the pad 12 is fully supported on the horse by the strapping 60 independently of the halter.

The material forming the various layers of the pad 12 may comprise any suitable materials to accomplish the respective functions of providing wear-resistance or some durability at the outer layer 40, providing some stiffening and puncture resistance at the stiffening layer 74, providing some additional structural support at the forming layer 76, providing some impact absorption at the padding layer 78 and providing some comfort and further impact absorbing at the inner padding layer 38. The inner padding layer 38 for instance may comprise any suitable lining material including for example: hospital felt, Sherpa® fleece, a variety of woven synthetic fibers or any other material of similar properties.

The throat pad 68 and the chin pad 70 may similarly be formed of plural layers including an outer protective layer of leather and the like and an inner lining material which is lighter and softer for more comfort against the skin of the horse as compared to the outer layer.

Turning now to the second embodiment as illustrated in FIGS. 7 through 11, the pad 12 in this instance is somewhat longer than the previous embodiment so as to substantially fully span the bridge of the face of the horse. The first end 11 of the pad thus terminates just above the nostrils so that when worn in combination with a halter, the chin strap of the halter overlaps the bridge portion of the pad 12.

Strapping 60 in the second embodiment is arranged in part by providing the poll portion 22 of the pad 12 with punched out holes 28 at the ends 24 behind the ears that secure a fastener strap 30 in place. The strap is a single long piece of material with a buckle 32 at the end that is used to fasten the facial safeguard to the horse. The fastener strap 30 comes down through the holes 28 in the poll portion 22 behind the ears on both sides of the horse's head, crosses under the cheek bones and is then fed upward through two top holes 34 in the long bridge portion 14 of the pad 12. Once the strap is fed upward through these holes 34, it is crossed over the nasal bone and then fed downward between a bottom pair of holes 36 in the bridge portion 14 and situated just behind the chin at the horses curb groove. Here the facial safeguard is fastened to the horse via the buckle 32 that connects the two ends of the strap 30. The pad 12 should be secured to fit snugly on the horses face. The illustrated crossing arrangement of the strap 30 between the poll portion 22 and the bridge portion 14 avoids the horse's throat and the nasal bone area so as not to interfere with the horse's breathing.

Figure 9:
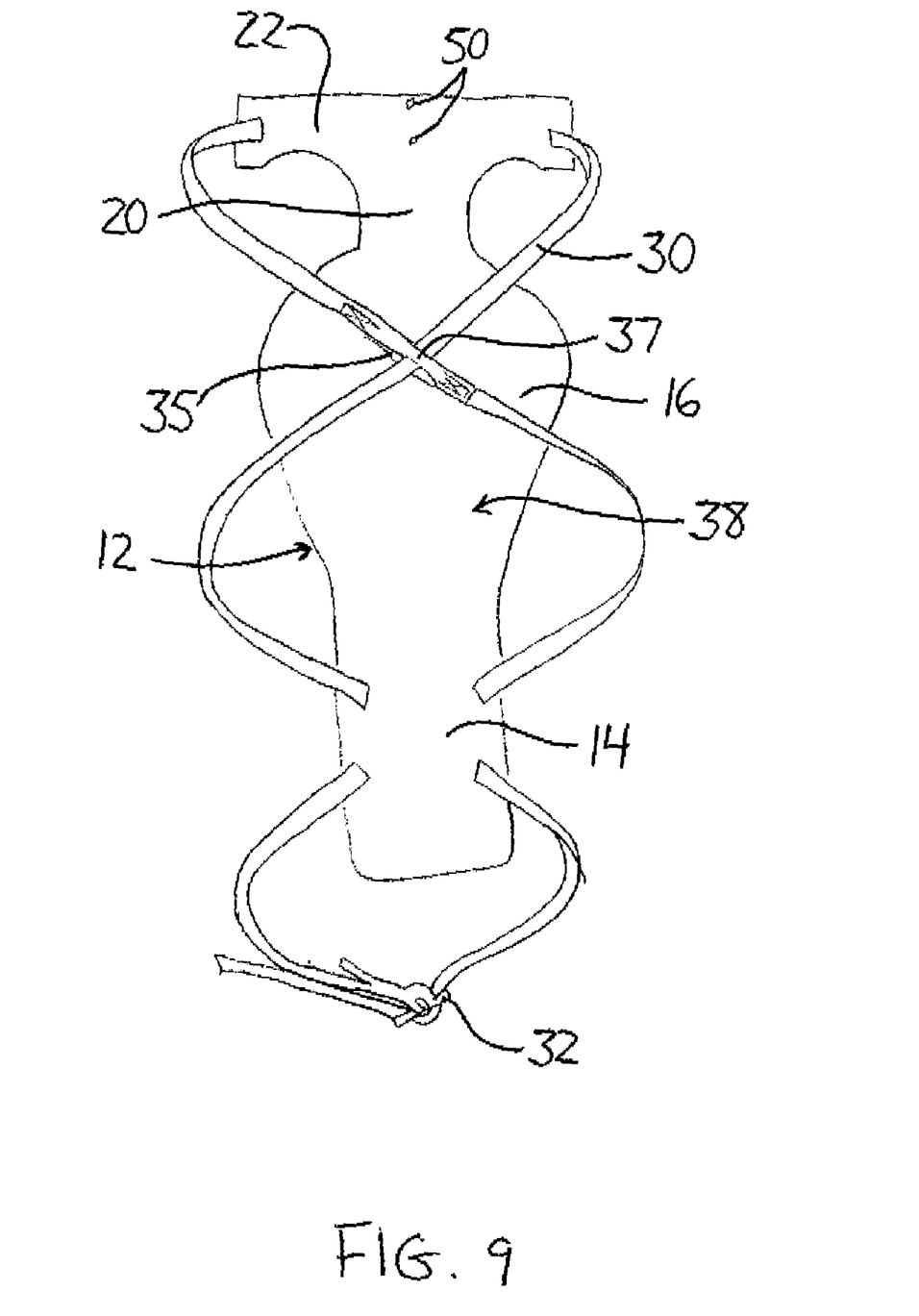
FIG. 9 is a rear view of the facial protection apparatus of FIG. 7.
Figure 10:
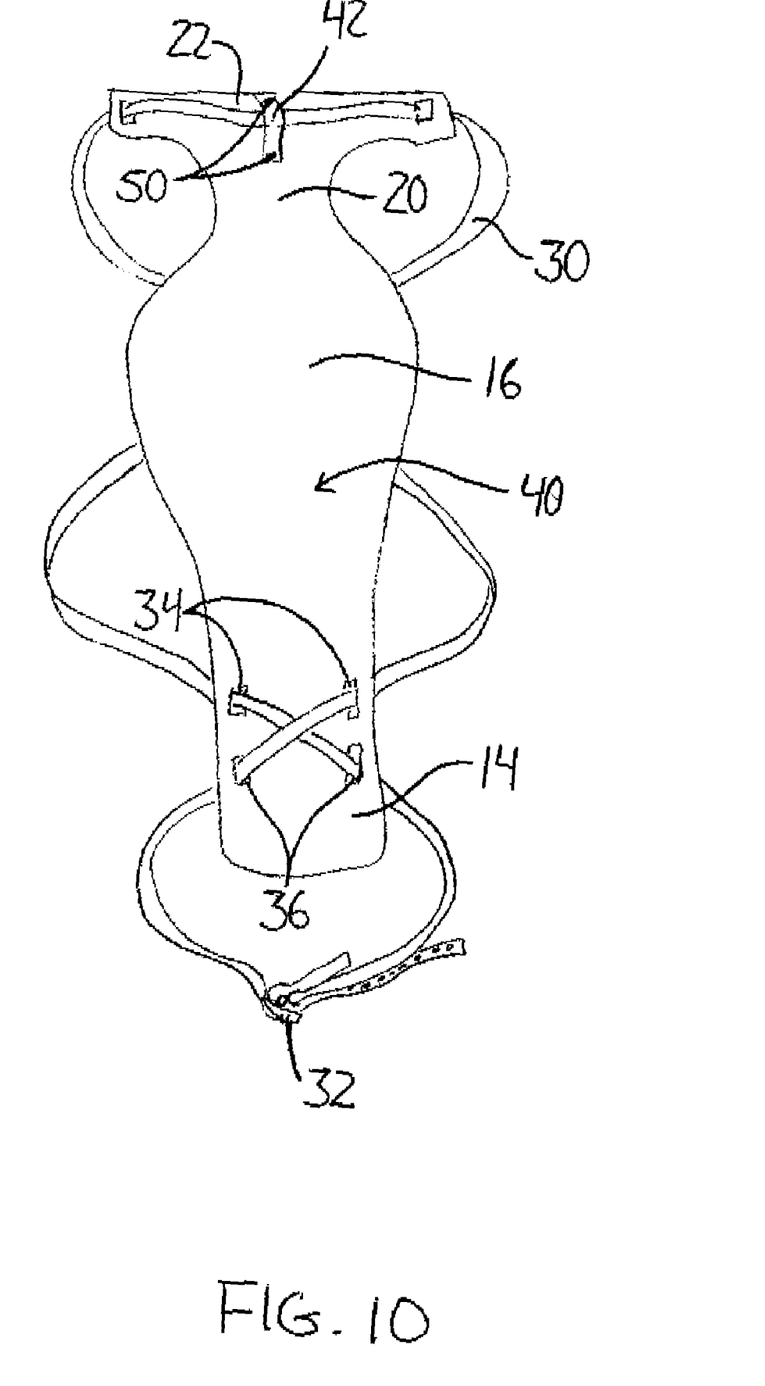
FIG. 10 is a front view of the facial protection apparatus of FIG. 7.

As seen in FIG. 9 a strap loop 35 is provided where the strap 30 crosses itself under the cheek bones. The loop consists of a piece of material 37 attached at opposite ends to the strap to define an opening between the piece 37 and the strap 30. When feeding the strap 30 through the various holes in the pad 12 to secure the facial shield 10 on a horse, an end of the strap 30 is passed through the strap loop 35 to position portions of the strap relative to each other.

Similarly to the first embodiment, the pad 12 according to the second embodiment has an inner, or rear, padding layer 38 and an outer, or front, protective layer 40. The protective layer 40 is firm and strong so as to repeatedly withstand impacts without significant wear or damage. The padding layer 38 is made of a soft material to increase the comfort of the pad 12 on the horse. This padding layer 38 prevents irritation that would otherwise be caused due to rubbing between the firm protective layer 40 and the horse's face and also helps to absorb some of the impact exerted on the protective layer 40. The protective layer 40 and the fastener strap 30 may be constructed from materials such as, but not limited to, leather, synthetic leather, nylon and polyethylene plastic. The padding layer 38 may be made of lining materials such as, but not limited to, synthetic fleece, sheepskin fleece, hospital felt and regular felt lining material. It should be appreciated that the dimensions of the facial shield 10, including the thickness of its layers 38 and 40 may be varied to achieve desired characteristics.

The lining material forming the padding layer 38 can be attached to the protective layer 40 by one of a number of practices including stitching and adhering. The buckle 32 may be made of metal, nickel, brass or other material of suitable strength and rigidity.

Figure 11:
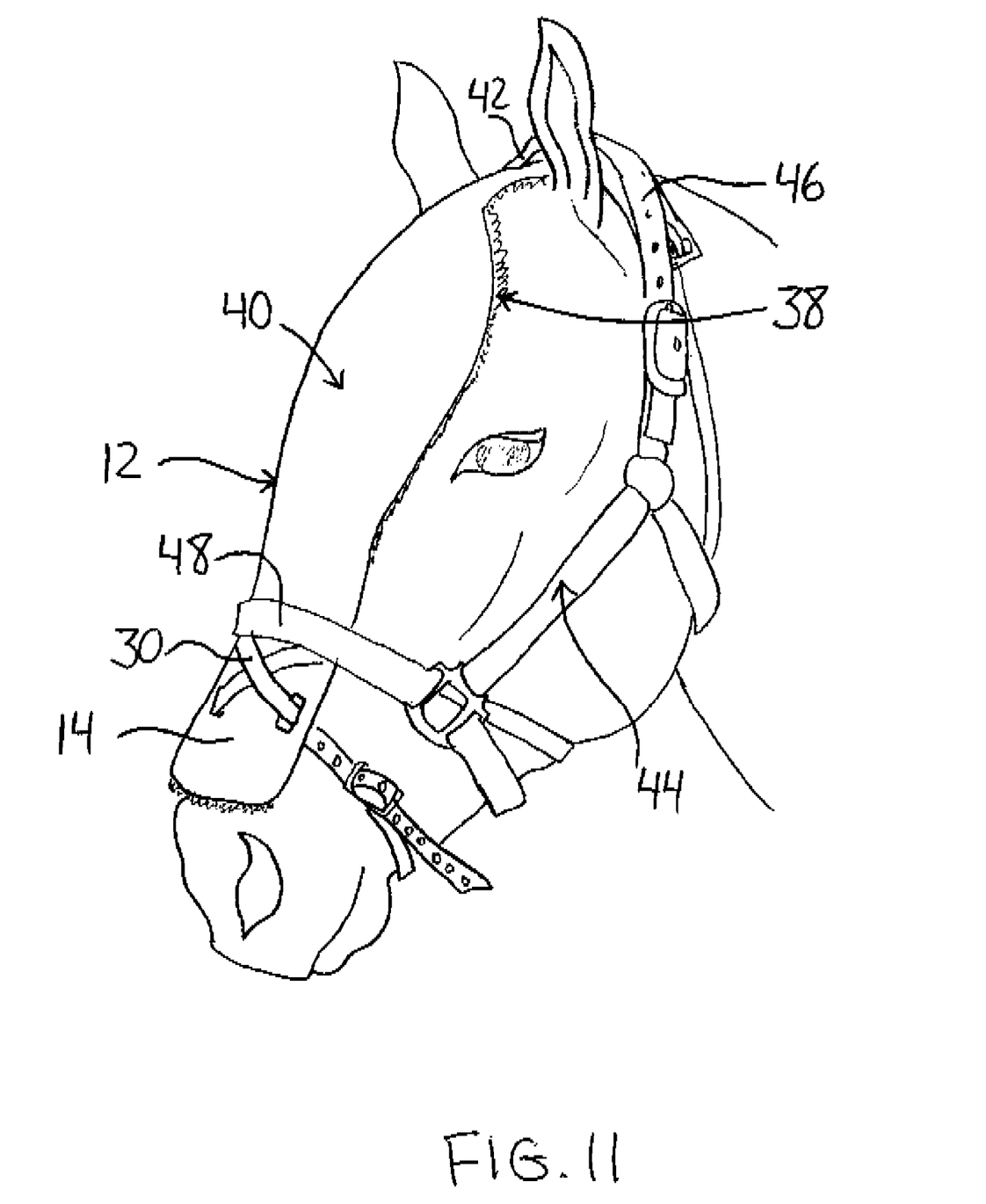
FIG. 11 is a side perspective view of the horse wearing the facial protection apparatus FIG. 7 with a halter.

The apparatus according to the second embodiment also works well in conjunction with a typical halter used to lead or tie a horse, As seen in FIG. 11, such a halter 44 can be worn over the full frontal facial safeguard 10. A well fit halter 44 can help stabilize and position the facial safeguard 10 when used properly. A halter loop 42 is provided generally centrally on the poll portion 22 behind the horse's ears. A poll strap 46 of the halter 44 that passes across the horse's head behind the ears is fed through the halter loop 42 to attach the halter 44 and facial safeguard 10. A bridge strap 48 of the halter 44 crosses over the horse's face at the bridge portion 14 of the pad 12 just above where the strap 30 crosses over the bridge portion 14. It should be appreciated that while the halter 44 helps secure the facial shield 10 to the horse, the present invention can be used with or without such a halter 44 in place. The halter loop 42 can be attached to the pad 12 by rivets or other fasteners known to those of skill in the art.

As described herein with regard to the exemplary embodiments, a full frontal facial safeguard or protective facial shield apparatus 10 for horses features a protective pad 12 for covering and protecting the front of a horse's face. These protected areas include the poll, the forehead, the forelock, the areas between and above the eyes and the long bridge extending downward to just above the nostrils. Areas that are not covered by the pad 12 include the muzzle, nostrils, chin, eyes, ears and cheeks.

Like the previous embodiment, in the second embodiment, the pad 12 lays flush against the horse's face and extends from a point at least partway along the bridge of the horse's face to the poll immediately behind the ears. The nose end of the pad 12 features a narrow elongate bridge portion 14 extending upward along the bridge to the eyes The bridge portion 14 is generally uniform in width from the nose end to a point just below the eyes, at which point the pad 12 begins to widen in proportion to the contours of the horse's head. A brow portion 16 extends upward from the eyes to cover the eyebrow and forehead areas of the face. Here, the pad continues to gradually widen from the bridge portion 14 to a widest point defined by the forehead. The brow portion 16 then narrows as it extends up from the forehead to a width proportional to the space between the horse's ears. The widening and narrowing of the pad 12 defines lobed outer edges 18 that curve outward transverse to the length of the horse's face. The edges 18 curve in such a way as to ensure that the pad 12 is narrow enough between the eyes so as not to interfere with the sight line of the horse, but wide enough above the eyes to adequately protect the eyebrow and forehead.

Extending further along the face from the brow portion 16 toward the poll end of the pad 12 is an ear portion 20 that is narrow enough to fit between the ears without contacting these sensitive parts of the animal. With this ear portion 20 sized as such, the pad 12 can be placed on the horse's head without irritating the sensitive ears and inducing a potentially dangerous physical reaction. The facial safeguard 10 thereby improves safety for both the animal and the person training the horse. At the upper end of the pad 12, a short, wide flap defines a poll portion 14 that extends across the poll of the horse to opposite ends 24 just behind the ears. The changes in width from the brow portion 16 to the ear portion 20 and finally to the poll portion 22 are all gradual and smooth so as to define visually appealing curved recesses 26 which are sufficient size to leave adequate room for the ears and a small surrounding area, thereby increasing comfort for the animal.

The facial safeguard for horses is padded, comfortable, ergonomic, lightweight, and very durable. Construction of the protective layer 40 from strong materials allows it to be able to adequately protect the front of the horses face. The present invention protects against and prevents wounds during any number of activities, including learning to tie, being loaded in a trailer, traveling, being transported, riding thru heavy brush and trees, and recovering from an existing facial injury or wound. Used for, and in accordance with, veterinary care and technique, the present invention can help protect an existing wound or to further the suture treatment of facial wounds. The present invention prevents unwanted wounds to the commonly injured areas of a horse's head, specifically the front of the face and the poll area, while avoiding the unnecessary and uncomfortable practice of enclosing the sides of the head. The present invention protects against a number of possible injuries, such as cuts, scrapes, scratches, bumps, bruises and puncture wounds. It should be appreciated that through modification of characteristics such as size and shape, the present invention can be adapted for use with horses of all ages, gender, breeds and disciplines.

As horses rarely injure the sides of their faces, it is unnecessary to enclose the head to provide adequate injury protection. By covering only the front of the face, the present invention prevents injury with a lighter, more comfortable apparatus that is easier to mount on a horse. With the sides open to the air, the apparatus does not trap heat and sweat and therefore allows the horses skin to breathe. In addition, this openness allows access to the side of the face which horses will often scratch with their hooves to relieve itching. The present invention is also less restrictive to the animal's movement than a head enclosing mask.

In preferred embodiments, the pad of the apparatus has 5 layers at the poll area comprising: a top layer of the finest vegetable tanned leather for durability and a stunning finish; an intermediate later of shape enhancing polystyrene which acts as a barrier acts as a barrier against puncture wounds and lacerations; an intermediate layer of high density foam padding for shock absorption; an intermediate layer of genuine suede for added weight and strength; and an underside layer of plush long knitted fleece for comfort.

The apparatus thus prevents and protects against unwanted and unnecessary injuries, wounds, and damaging scars to a horse's face and poll region while trailering, transporting, or schooling.

The apparatus is a unique leather made product. It is handmade from the finest quality leather, underlined with plastic, foam, and suede, and then backed by soft Sherpa R Fleece. These carefully constructed layers are precisely sewn together with strong, cream colored saddle thread. The apparatus may come standard in two colors of leather, Walnut and Burgundy, and can be accented with Italian made Basket Weave or Oak Leaf tooling. Brass name plates and silver lettering for personalization can also be made available. Two sizes for either "Standard" or "Large" breed will accommodate a vast variety of equine breeds.

Each apparatus is a quality, handmade product that is constructed of the finest materials and made with the utmost care for the better well being of the horse. The apparatus is easy to fit, comes in a variety of sizes and options, and is fully adjustable to meet a horse's needs.

As described herein, the apparatus 10 is a protective product it is specifically designed to prevent and protect equine against unwanted and unnecessary frontal facial trauma, injuries, wounds, and scars while offering unbeatable poll protection. It is constructed of quality leather and Sherpa R Fleece which makes this product extremely durable and easy to clean. The apparatus offers maximum equine head protection and generous facial coverage with minimal effort from the handler and zero discomfort to the horse. The apparatus has potential to revolutionize how horses are cared for while trailering, transporting, and schooling.

The apparatus 10 will cut down on costly veterinary bills. It will prevent and protect against facial and poll damage. It will protect horses against ugly scaring and malformation of facial tissues and features. It offers maximum protection without impeding the field of vision or interrupting, the breathing of the horse. The extensive facial and head coverage areas of the horse includes the Poll, the Parietal region, the temporal region, the Supra Orbital region, the Frontal Sinus region, and a substantial portion of the Dorsal Nasal region.

The skeleton of the horse is made up of 205 bones the skull alone has 34 bones, making it the $5^{th}$ largest concentration of bones. Generally when wounds occur on the front of the face area, it happens to the skin on bone, making it very painful for the horse. There is no muscle on the front of the face to cushion the blows from trauma. When an injury occurs on the face, there is generally a lot of blood flow, which is good for healing, but it can be hard to stop and control, especially when the horse is in intense pain. Also, the face of a horse generally scars the worst because they are often the most difficult wounds to suture and care for. If a horse has punctured or injured his face to the bone, there is a substantial risk of infection the bone, if not treated properly by a veterinarian. This type of injury can be costly and lengthy to treat, and can often lead to death. Accordingly, the apparatus 10 can pay for itself in a single use when compared to unexpected and costly veterinarian bills.

Because horses are blind directly in front of them, the apparatus 10 can be worn with little or no notice from the horse. The shape, fit, and simplicity of the apparatus makes it easy to apply and remove by the handler. It is lightweight and breaths easily.

The apparatus is best used when teaching a horse to load and unload in a trailer. The apparatus is also useful while trailering, transporting, teaching to stand tied, teaching to 'hot walk', while schooling in the starting gates, and for horses that are simply careless with their heads and unaware of their surroundings. The apparatus 10 will also be beneficial for gelding procedures, teeth floating procedures, or anytime a horse needs to be 'put under' to proceed with veterinarian care or while treating existing facial wounds and injuries.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A facial protection apparatus for a face of a horse comprising:
    a protective pad extending in a longitudinal direction between opposed first and second ends, the pad comprising:
        a bridge portion at the first end of the pad which is elongate in the longitudinal direction and which is arranged to span at least a portion of a bridge of the face of the horse;
        a brow portion extending in the longitudinal direction from the bridge portion towards the second end of the pad, the brow portion being arranged to span a portion of the face of the horse above eyes of the horse; and
        an ear portion extending in the longitudinal direction from the brow portion towards the second end of the pad, the ear portion being arranged to span between ears of the horse; and
    strapping arranged to secure the pad against the face of the horse such that facial cheeks and eyes of the horse remain uncovered and a view from each of the eyes of the horse remains substantially unobstructed;
    the brow portion includes opposed side edges which are stepped to increase width of the brow portion in relation to the bridge portion in a lateral direction perpendicular to the longitudinal direction at an eyebrow area of the horse;
    the strapping being arranged to support the brow portion to span over the eyebrow area of the horse such that an orbital region of the horse is substantially covered by the brow portion.

2. The apparatus according to claim 1 wherein the strapping is arranged to secure the pad to extend over the poll area of the horse.

3. The apparatus according to claim 1 wherein the ear portion is narrower than the brow portion in a lateral direction extending generally perpendicularly to the longitudinal direction.

4. The apparatus according to claim 1 wherein the strapping is arranged to support the brow portion spaced ahead of the ears of the horse such that an area of the face of the horse immediately in front of both ears is substantially uncovered by the pad.

5. The apparatus according to claim 1 wherein the ear portion is narrower than the bridge portion in a lateral direction extending substantially perpendicular to the longitudinal direction.

6. The apparatus according to claim 1 wherein the pad includes a poll portion at the second end of the pad which is wider than the ear portion in a lateral direction extending generally perpendicularly to the longitudinal direction and wherein the strapping is arrange to support the pad such that the poll portion extends behind ears of the horse.

7. The apparatus according to claim 1 wherein the strapping includes a throat strap arranged to extend around a throat of the horse, the throat strap being secured to the second end of the pad.

8. The apparatus according to claim 1 wherein the pad includes a poll portion at the second end thereof which is wider than the ear portion in a lateral direction extending generally perpendicularly to the longitudinal direction and wherein laterally opposed ends of the poll portion are connected to opposing sides of the brow portion respectively by ear straps.

9. The apparatus according to claim 1 wherein the strapping is arranged to secure the pad against the face of the horse independently of a halter worn by a horse.

10. The apparatus according to claim 1 wherein the strapping comprises a throat strap connected to the second end of the pad and arranged to be secured beneath the throat of the horse and a chin strap secured to the first end of the pad and arranged to be secured beneath the chin of the horse.

11. The apparatus according to claim 10 wherein
the throat strap and the chin strap being joined at each side of the pad by a respective cheek strap extending generally in the longitudinal direction of the pad; and
the cheek straps being spaced laterally outwardly from the sides of the pad.

12. The apparatus according to claim 1 in combination with a halter worn over the head of a horse and including a bridge strap about the bridge of a horse and a poll strap about the poll of the horse,
the pad being shorter in the longitudinal direction than a distance between the bridge strap and the poll strap of the halter.

13. The apparatus according to claim 12 wherein the pad comprises an outer wear-resistant layer and an inner lining layer which is softer than the outer wear-resistant layer, the inner lining layer being wrapped overtop of the outer wear-resistant layer at the first end of the pad.

14. The appratus according to claim 1 wherein the protective pad comprises at least an outer wear-resistant layer, an inner lining layer which is softer than the outer wear-resistant layer, and an inner padding layer formed of impact absorbing material adjacent the second end of the pad.

15. The apparatus according to claim 1 wherein the pad comprising at least of an outer wear-resistant layer comprising a wear-resistant material, an inner lining layer which is softer than the outer wear-resistant layer and arranged for forming an inner liner against the animal and a stiffener layer between the wear-resistant layer and the inner lining layer which is stiffer than both the wear-resistant layer and the inner lining layer and which is arranged to hold a general shape which conforms about the face of the animal.

* * * * *